(12) United States Patent
Kim

(10) Patent No.: US 8,493,899 B2
(45) Date of Patent: Jul. 23, 2013

(54) APPARATUS AND METHOD FOR CONTROLLING SLEEP MODE ENTRY IN BROADBAND WIRELESS COMMUNICATION SYSTEM

(75) Inventor: Chang-Yeon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1091 days.

(21) Appl. No.: 12/009,686

(22) Filed: Jan. 22, 2008

(65) Prior Publication Data

US 2008/0175180 A1 Jul. 24, 2008

(30) Foreign Application Priority Data

Jan. 22, 2007 (KR) .................. 10-2007-0006509

(51) Int. Cl.
*G08C 17/00* (2006.01)
(52) U.S. Cl.
USPC ........................................... 370/311
(58) Field of Classification Search
USPC ........................................... 370/311
See application file for complete search history.

(56) References Cited

U.S. PATENT DOCUMENTS

| 6,331,971 | B1 | 12/2001 | Raith | |
|---|---|---|---|---|
| 7,231,221 | B2* | 6/2007 | Assarsson et al. | 455/458 |
| 2005/0049012 | A1* | 3/2005 | Chang et al. | 455/574 |
| 2005/0070340 | A1* | 3/2005 | Kim | 455/574 |
| 2005/0075148 | A1* | 4/2005 | Park | 455/574 |
| 2006/0240799 | A1* | 10/2006 | Kim et al. | 455/343.2 |
| 2007/0201413 | A1* | 8/2007 | Laine et al. | 370/338 |
| 2007/0250726 | A1* | 10/2007 | Rossetti et al. | 713/320 |

FOREIGN PATENT DOCUMENTS

| KR | 1020050009662 | 1/2005 |
|---|---|---|
| KR | 1020050059986 | 6/2005 |
| WO | WO 2006/040769 A1 | 4/2006 |

* cited by examiner

*Primary Examiner* — Asad Nawaz
*Assistant Examiner* — Saad A Waqas

(57) ABSTRACT

A sleep mode entry of a terminal in a broadband wireless communication system is provided. A base station includes an adjuster for, when a first terminal requests a sleep mode entry and lengths of requested sleep interval and listening interval do not meet a certain condition, adjusting the lengths of the sleep interval and the listening interval; and a determiner for setting a distribution of the sleep interval and the listening interval according to the adjustment of the adjuster and determining a sleep mode entry time of a second terminal which enters a sleep mode after the distribution of the sleep interval and the listening interval is set.

20 Claims, 6 Drawing Sheets

S : SLEEP INTERVAL

L : LISTENING INTERVAL

APPARATUS AND METHOD FOR CONTROLLING SLEEP MODE ENTRY IN BROADBAND WIRELESS COMMUNICATION SYSTEM

CROSS-REFERENCE TO RELATED APPLICATION(S) AND CLAIM OF PRIORITY

This application claims priority under 35 U.S.C. §119(a) to an application filed in the Korean Intellectual Property Office on Jan. 22, 2007 and assigned Serial No. 2007-0006509, the disclosure of which is herein incorporated by reference.

TECHNICAL FIELD OF THE INVENTION

The present invention relates generally to a broadband wireless communication system. More particularly, the present invention relates to an apparatus and a method for controlling a sleep mode entry of a terminal in the broadband wireless communication system.

BACKGROUND OF THE INVENTION

In a fourth generation (4G) communication system, research has been conducted to provide users with various Quality of Service (QoS) levels at a data rate of about 100 Mbps. Specifically, research of 4G communication systems has been conducted into a high rate service support to guarantee mobility and QoS in Broadband Wireless Access (BWA) communication systems such as Local Area Network (LAN) systems and Metropolitan Area Network (MAN) systems. Representative 4G communication systems include Institute of Electrical and Electronics Engineers (IEEE) 802.16 communication systems.

The 802.16 communication system defines modes of a terminal, which include a normal mode, a sleep mode, and an idle mode. In the normal mode, the terminal communicates with a base station. In the idle mode, the terminal returns a Connection ID (CID) and merely checks a periodic paging message. In the sleep mode, the terminal temporarily stops the communication without returning the CID.

To the terminal in the sleep mode, a frame includes a sleep interval and a listening interval by turns as shown in FIG. 1. The sleep interval and the listening interval are constituted on a frame basis. The sleep interval gradually increases from a minimum value to a maximum value, and the listening interval is a fixed value in the sleep mode. The sleeping terminal does not perform any operation at all in the sleep interval to save the power, and confirms a TRaFfic INDicator MeSsaGe (TRF-IND MSG) received from the base station in the listening interval. Herein, the TRF-IND MSG informs of whether there is traffic to be transmitted to the sleeping terminal. For doing so, the base station needs to schedule downlink resources to send the TRF-IND MSG in accordance with the listening interval.

To enter the sleep mode, the terminal requests a sleep mode entry to the base station. The base station determines whether to accept the sleep mode entry request by checking the number of the sleeping terminals at present. When the sleeping terminals admitted are not full, that is, when the number of the sleeping terminals at present does not reach a maximum value, the base station permits the sleep mode entry of the terminal.

As discussed above, by determining whether to enter the sleep mode solely based on the number of acceptable sleeping terminals, the sleep intervals and the listening intervals of the sleeping terminal are distributed irregularly. Thus, the base station has to separately manage the listening interval of each sleeping terminal on the terminal basis. In other words, since the listening intervals of the sleeping terminal are distributed irregularly, the scheduling of the base station for the sleeping terminal is seriously complicated.

SUMMARY OF THE INVENTION

To address the above-discussed deficiencies of the prior art, it is a primary aspect of the present invention to substantially solve at least the above problems and/or disadvantages and to provide at least the advantages below. Accordingly, an aspect of the present invention is to provide an apparatus and a method for mitigating a scheduling complexity of a base station with respect to a sleeping terminal in a broadband wireless communication system.

Another aspect of the present invention is to provide an apparatus and a method for managing a sleep mode entry time of a terminal in a broadband wireless communication system.

Yet another aspect of the present invention is to provide an apparatus and a method for synchronizing listening intervals of sleeping terminals in a broadband wireless communication system.

The above aspects are achieved by providing a base station in a broadband wireless communication system. The base station includes an adjuster for, when a first terminal requests a sleep mode entry and lengths of requested sleep interval and listening interval do not meet a certain condition, adjusting the lengths of the sleep interval and the listening interval; and a determiner for setting a distribution of the sleep interval and the listening interval according to the adjustment of the adjuster and determining a sleep mode entry time of a second terminal which enters a sleep mode after the distribution of the sleep interval and the listening interval is set.

According to one aspect of the present invention, a method for controlling a sleep mode entry of a terminal at a base station in a broadband wireless communication system includes checking whether lengths of requested sleep interval and listening interval meet a certain condition when a first terminal requests a sleep mode entry; adjusting the lengths of the sleep interval and the listening interval when the condition is not satisfied; setting a distribution of the sleep interval and the listening interval according to the adjustment; and determining a sleep mode entry time of a second terminal which enters a sleep mode after the distribution of the sleep interval and the listening interval is set.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 2A through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The present invention provides a technique for synchronizing listening intervals of a sleeping terminal in a broadband wireless communication system. It is assumed that an Orthogonal Frequency Division Multiplexing (OFDM) wireless communication system is employed. Yet, the present invention is applicable to other wireless communication systems.

First of all, a sleep interval and a listening interval of a sleeping terminal are described in detail.

Figure 1:
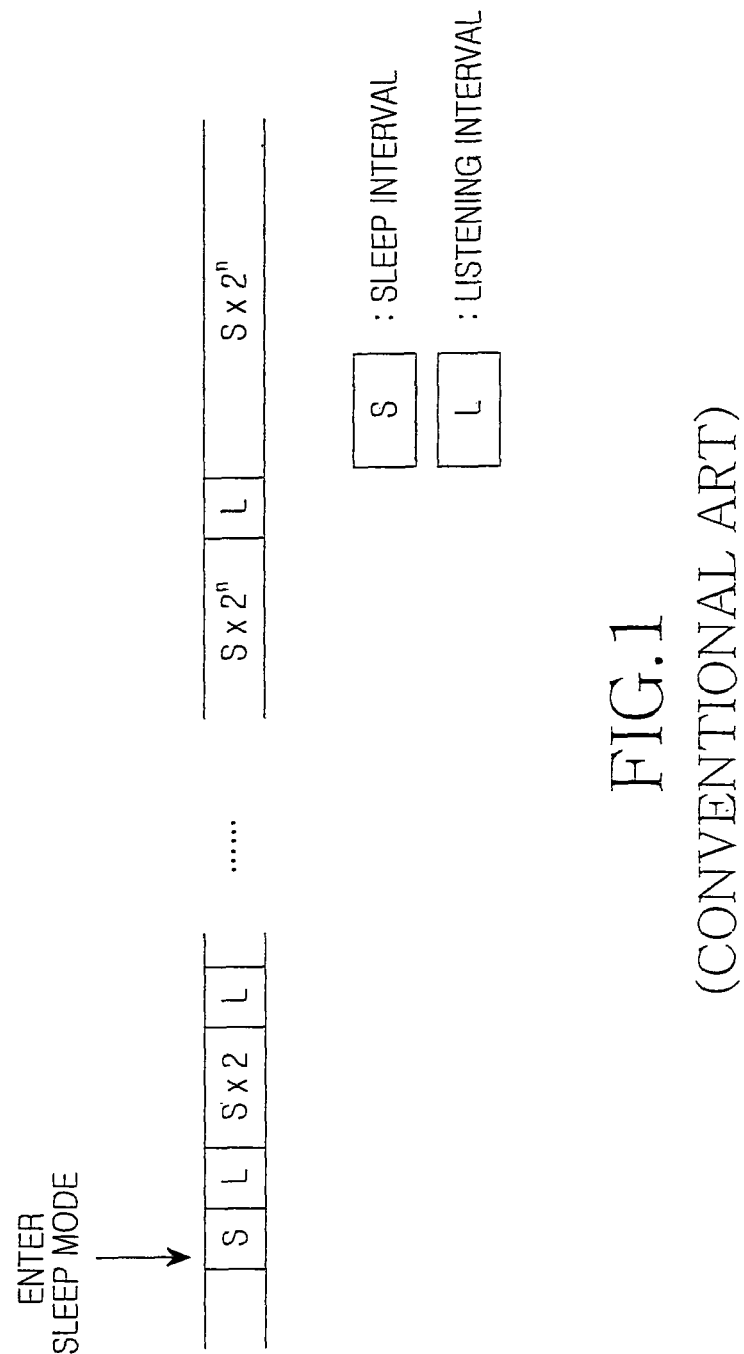
FIG. 1 is a diagram of a distribution of sleep intervals and listening intervals of a sleeping terminal in a general broadband wireless communication system.
Figure 2A:
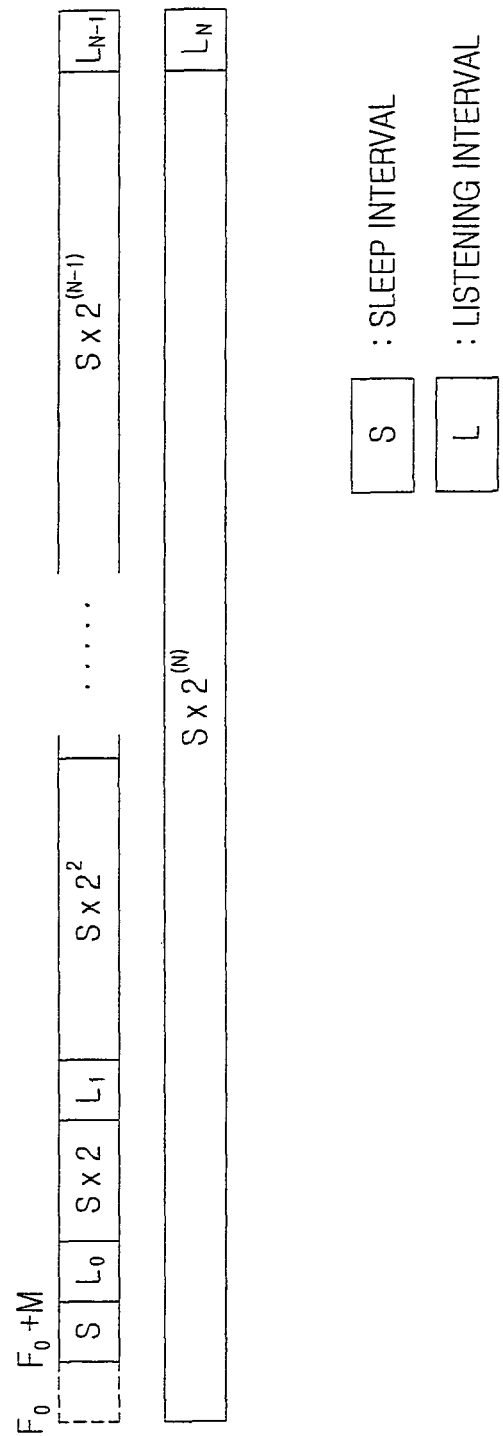
FIGS. 2A and 2B are diagrams of a distribution of sleep intervals and listening intervals of a sleeping terminal in a broadband wireless communication system according to an embodiment of the present invention.
Figure 2B:
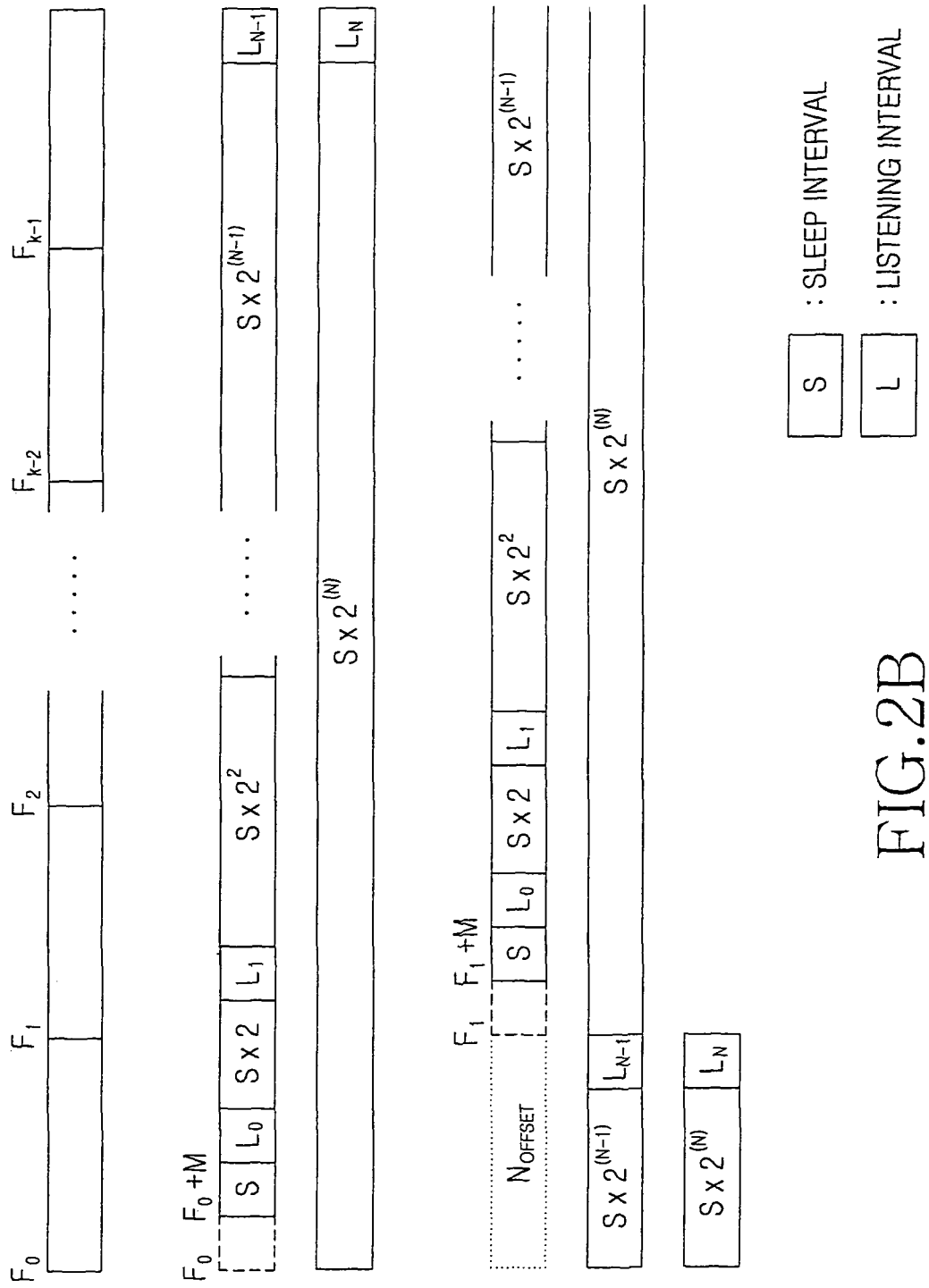

FIGS. 2A and 2B illustrate a distribution of sleep intervals and listening intervals of a sleeping terminal in a broadband wireless communication system according to an embodiment of the present invention.

Referring to FIG. 2A, the distribution of the sleep intervals and the listening intervals according to an embodiment of the present invention satisfies a condition of Equation 1:

$$S \times 2^N + L \leq S + S \times 2 + \ldots + S \times 2^{(N-1)} + L \times N \quad \text{[Eqn. 1]}$$

In Equation 1, S denotes the number of initial sleep interval frames, N denotes an exponential component of the maximum sleep interval frame number, and L denotes the number of listening interval frames. Equation 1 can be simplified as Equation 2:

$$S \geq L \times (N-1) \quad \text{[Eqn. 2]}$$

In Equation 2, S denotes the number of initial sleep interval frames, N denotes an exponential component of the maximum sleep interval frame number, and L denotes the number of listening interval frames.

In other words, the total length of the maximum sleep interval and listening interval should be greater than or equal to the total length of the remaining sleep interval frames and listening interval frames as shown in FIG. 2A. To ease the understanding, the total length of the maximum sleep interval and listening interval is referred to as a 'LEN'. When the numbers from 0 to LEN-1 are given to the frames repeatedly, the number of the frame entering the sleep mode, that is, the number of $f_0+m$ frame is constantly the same. Accordingly, based on the number of the frame entering the sleep mode, the start frame positions of all other listening intervals can be easily acquired.

Without the terminal in the sleep mode, when the length of the sleep interval and the listening interval of a terminal first entering the sleep mode is set to satisfy the above-mentioned condition, the setting controls sleep mode entry times of subsequent terminals entering the sleep mode. More specifically, when one sleeping terminal repeats the sleep interval and the listening interval as shown in FIG. 2A and another terminal requests an initial sleep interval of S×2, the another terminal can enter the sleep mode in the frame after the listening interval $L_0$. As a result, the listening interval of every sleeping terminal can be synchronized and the scheduling complexity of a base station can be reduced.

However, as the sleep mode entry time is fixed on the single basis, the terminal may wait for quite a long time to enter the sleep mode. For example, when requesting the initial sleep interval of S during the first sleep interval, the terminal can enter the sleep mode after waiting for about LEN-ary frames. To address this problem, the criterion of the sleep mode entry time is increased to five criteria. As shown in FIG. 2B, a frame offset value $N_{offset}$ of a certain length is set and $f_0, f_1, \ldots, f_{k-1}$ frames are used as the sleep mode entry criterion frames. Hence, when a certain terminal requests the initial sleep interval of S in the $f_1$ frame of FIG. 2B, the terminal can enter the sleep mode in $f_1+m$ frame without having to wait for the LEN-ary frames. That is, a sleep mode group is constituted on each criterion frame, and the terminal is classified to the fastest sleep mode entry group and then enters the sleep mode.

Now, a structure and operations of a base station which manages the sleeping terminal are explained in detail by referring to the drawings.

Figure 3:
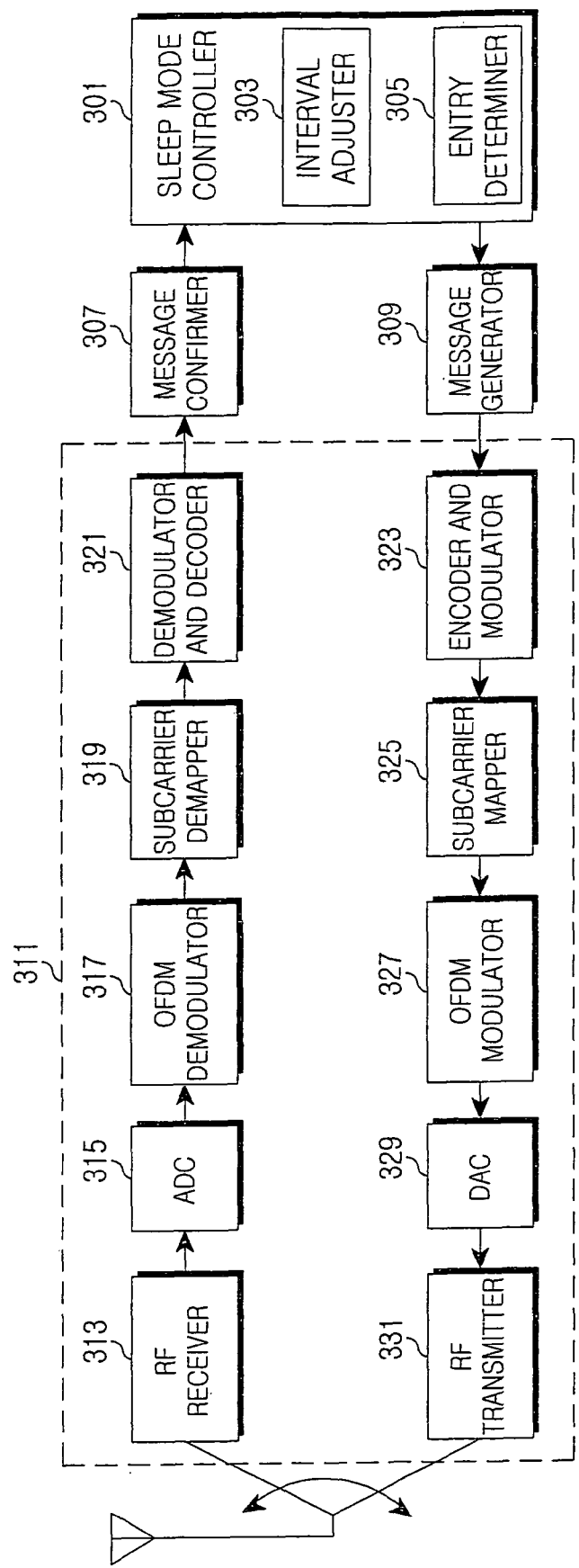
FIG. 3 is a block diagram of a base station in the broadband wireless communication system according to an embodiment of the present invention.

FIG. 3 is a block diagram of a base station in the broadband wireless communication system according to an embodiment of the present invention.

The base station of FIG. 3 includes a sleep mode controller 301, a message confirmer 307, a message generator 309, and a radio communication part 311.

The sleep mode controller 301 confirms a sleep mode request message received from the terminal and determines whether to permit the sleep mode entry of the terminal. In the embodiment of the present invention, when the lengths of the sleep interval and the listening interval do not meet the condition of Equation (2) as requested by the terminal, an interval adjuster 303 of the sleep mode controller 301 adjusts the lengths of the sleep interval and the listening interval. In doing so, when there is at least one sleeping terminal at present, the sleep interval length of the terminal should be $2^m$ times (m is an integer) the minimum sleep interval length currently in use and the listening interval length should be equal to the current listening interval length.

An entry determiner 305 of the sleep mode controller 301 controls the sleep mode entry time of the next terminal which tries to enter the sleep mode when there is the sleeping terminal already; that is, when at least one terminal is already in the sleep mode. Herein, the entry time control is performed depending on the distribution of the sleep intervals and the listening intervals set by the terminal which initially enters the sleep mode; that is, which enters the sleep mode alone when there is no sleeping terminal at all. The entry determiner 305 permits the sleep mode entry of the terminal in the frame where the sleep interval of the same length as the initial sleep interval length of the terminal requesting the sleep mode entry is commenced. In the embodiment of the present invention, there can be a single or a plurality of criterion frames to calculate the sleep interval length. With the plurality of criterion frames, the entry determiner 305 permits the sleep mode entry of the terminal in the closest start frame of the sleep interval start frames of the same length as the initial sleep interval length calculated based on the criterion frames. When the sleeping terminals are full, the entry determiner 305 accepts no sleep mode entry request at all.

The message confirmer 307 confirms a message received from the terminal. Particularly, the message confirmer 307 confirms length information of the sleep interval and the listening interval requested by the terminal in the sleep mode request message received from the terminal and provides the length information to the sleep mode controller 301. The message generator 309 generates a sleep mode response message to be sent to the corresponding terminal under the control of the sleep mode controller 301. The sleep mode response message includes information relating to the lengths of the sleep interval and the listening interval, and the sleep interval entry time.

The radio communication part 311 processes signals to transmit and receive data on a radio channel. The radio communication part 311 includes a Radio Frequency (RF) receiver 313, an Analog to Digital Converter (ADC) 315, an OFDM demodulator 317, a subcarrier demapper 319, a demodulator and decoder 321, an encoder and modulator 323, a subcarrier mapper 325, an OFDM modulator 327, a Digital to Analog Converter (DAC) 329, and an RF transmitter 331.

The RF receiver 313 converts an RF signal received on an antenna to a baseband analog signal. The ADC 315 converts the analog signal output from the RF receiver 313 to a digital signal. The OFDM demodulator 317 output a frequency-domain signal by Fast Fourier Transform (FFT)-processing the time-domain signal output from the ADC 315. The subcarrier demapper 319 demaps the signal mapped to the frequency domain, which is output from the OFDM demodulator 317. The demodulator and decoder 321 outputs information bit stream by demodulating and decoding the signal output from the subcarrier demapper 319 using a corresponding scheme.

The encoder and modulator 323 outputs a complex symbol signal by encoding and modulating the information bit stream using a corresponding scheme. The subcarrier mapper 325 maps the signal output from the encoder and modulator 323 to the corresponding subcarriers according to the scheduling result. The OFDM modulator 327 converts the signals output from the subcarrier mapper 325 to OFDM symbols through Inverse Fast Fourier Transform (IFFT). The DAC 329 converts the digital signal output from the OFDM modulator 327 to an analog signal. The RF transmitter 331 converts the baseband signal output from the DAC 329 to an RF signal and transmits the RF signal over the antenna.

Figure 4:
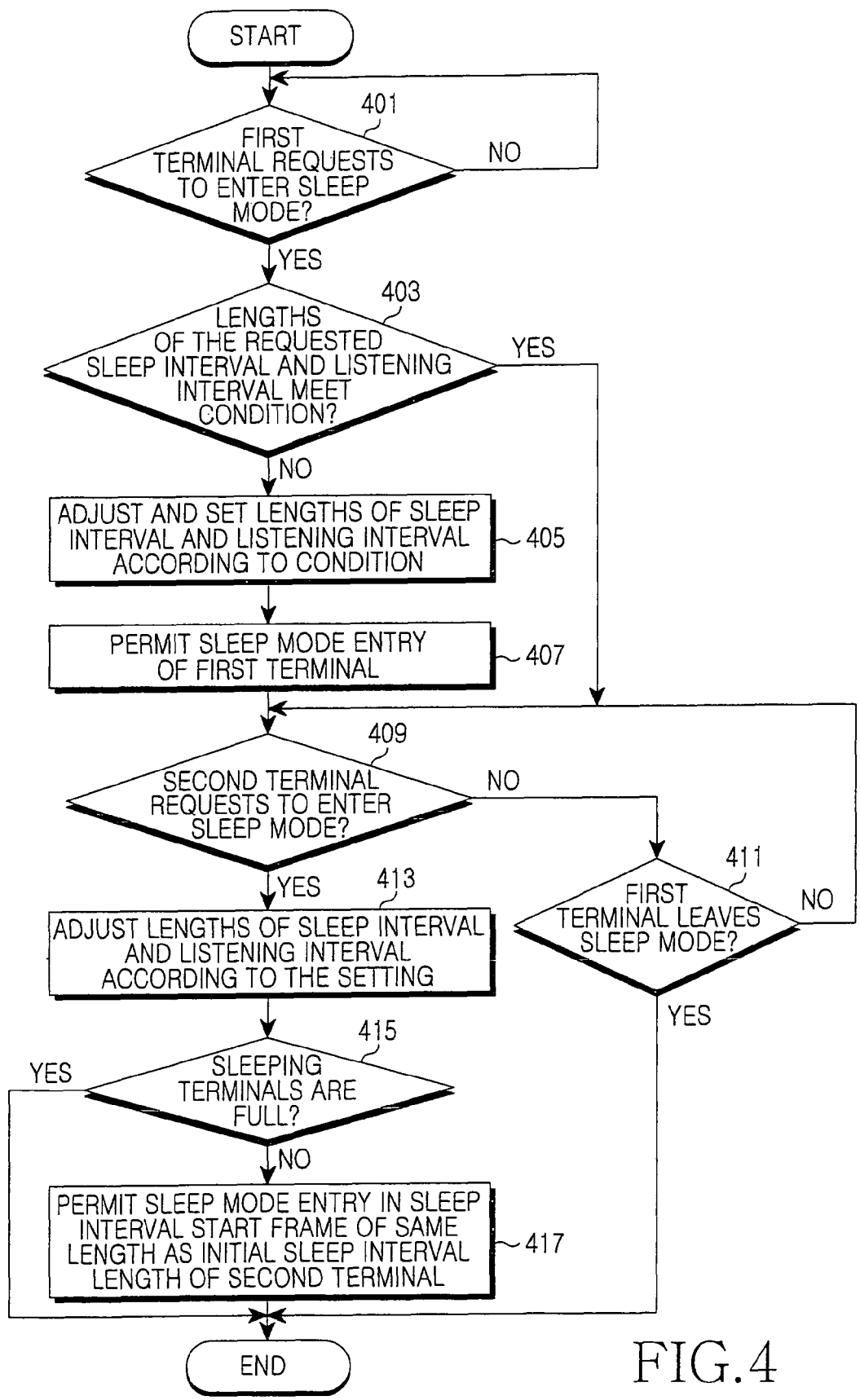
FIG. 4 is a flowchart of a method for managing a sleeping terminal at the base station in the broadband wireless communication system according to an embodiment of the present invention.

FIG. 4 is a flowchart of a method for managing the sleeping terminal at the base station in the broadband wireless communication system according to an embodiment of the present invention. In this embodiment of the present invention, the listening intervals of every sleeping terminal are synchronized with one criterion frame.

Without a sleeping terminal, the base station checks whether a first terminal requests the sleep mode entry in step 401. That is, the base station checks whether a sleep mode request message is received from the first terminal.

When the first terminal requests the sleep mode entry, the base station determines whether the lengths of the sleep interval and the listening interval requested meet the condition of Equation (2) in step 403. In other words, The base station checks whether the total length of the maximum sleep interval and listening interval according to the sleep interval and listening interval length requested by the first terminal is greater than or equal to the total number of the frames of the remaining sleep intervals and listening intervals.

When the condition is not satisfied, the base station adjusts the lengths of the sleep interval and the listening interval to meet the condition of Equation (2) and sets the distribution of the sleep intervals and the listening intervals based on the adjusted values in step 405.

In step 407, the base station permits the sleep mode entry of the first terminal. That is, the base station transmits the sleep mode response message to the first terminal.

In step 409, the base station checks whether a second terminal requests the sleep mode entry while the first terminal still remains in the sleep mode. That is, the base station checks whether the sleep mode request message is received from the second terminal.

When there is no sleep mode entry request from the second terminal, the base station checks whether the first terminal leaves the sleep mode in step 411. When the first terminal leaves the sleep mode, there is no more sleeping terminal and the setting of the sleep interval and the listening interval is initialized. Thus, this process is terminated and then re-performed when a terminal initially enters the sleep mode.

By contrast, when the second terminal requests the sleep mode entry, the base station adjusts the lengths of the sleep interval and the listening interval of the second terminal according to the setting in step 413. In other words, the base station adjusts the sleep interval length of the second terminal to be $2^m$ times (m is an integer) the set minimum sleep interval length and adjusts the listening interval length to be equal to the set listening interval length.

In step 415, the base station checks whether the sleeping terminals are full. When the sleeping terminals are full, the base station finishes this process.

By contrast, when the sleeping terminals are not full, the base station permits the sleep mode entry of the terminal in the sleep interval start frame of the same length as the initial sleep interval length requested by the second terminal in step 417. Namely, the base station transmits the sleep mode response message to the second terminal.

Figure 5:
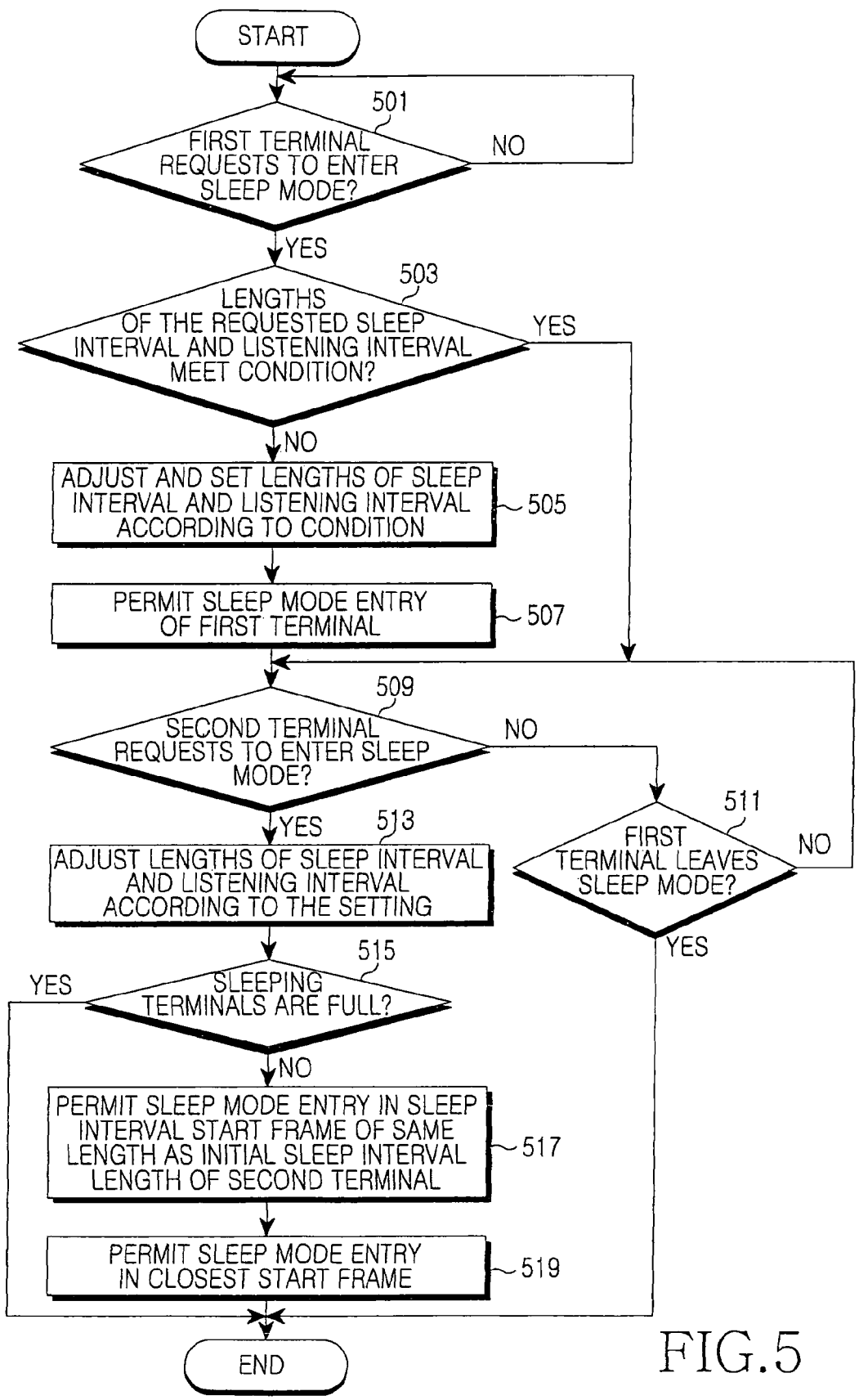
FIG. 5 is a flowchart of a method for managing a sleeping terminal at the base station in the broadband wireless communication system according to another embodiment of the present invention.

FIG. 5 is a flowchart of a method for managing a sleeping terminal at the base station in the broadband wireless communication system according to another embodiment of the present invention. In another embodiment of the present invention, the listening intervals of the sleep mode groups are synchronized using a plurality of criterion frames.

When there is no sleeping terminal, the base station checks whether a first terminal requests the sleep mode entry in step 501. That is, the base station checks whether a sleep mode request message is received from the first terminal.

When the first terminal requests to enter the sleep mode, the base station checks whether the lengths of the sleep interval and the listening interval requested meet the condition of Equation (2) in step 503. Specifically, the base station checks whether the total length of the maximum sleep interval and listening interval according to the sleep interval and listening interval length requested by the first terminal is greater than or equal to the total number of the frames of the remaining sleep intervals and listening intervals.

When the condition is not satisfied, the base station adjusts the lengths of the sleep interval and the listening interval to meet the condition of Equation (2) and sets the distribution of the sleep intervals and the listening intervals based on the adjusted values in step 505.

In step 507, the base station permits the sleep mode entry of the first terminal. That is, the base station transmits a sleep mode response message to the first terminal.

In step 509, the base station checks whether a second terminal requests the sleep mode entry while the first terminal still stays in the sleep mode. That is, the base station checks whether the sleep mode request message is received from the second terminal.

When there is no sleep mode entry request from the second terminal, the base station checks whether the first terminal leaves the sleep mode in step 511. When the first terminal leaves the sleep mode, there is no more sleeping terminal and the setting of the sleep interval and the listening interval is initialized. Thus, this process is terminated and then re-performed when a terminal initially enters the sleep mode.

By contrast, when the second terminal requests the sleep mode entry, the base station adjusts the lengths of the sleep interval and the listening interval of the second terminal according to the setting in step 513. In other words, the base station adjusts the sleep interval length of the second terminal to be 2m times (m is an integer) the set minimum sleep interval length and adjusts the listening interval length to be equal to the set listening interval length.

In step 515, the base station checks whether the sleeping terminals are full. When the sleeping terminals are full, the base station finishes this process.

By contrast, when the sleeping terminals are not full, the base station calculates the sleep interval start frames of the same length as the requested initial sleep interval length with respect to the plurality of the criterion frames in step 517. For example, when the initial sleep interval length requested by the terminal is S×2, the base station calculates the sleep interval start frame of the length S×2 with respect to each criterion frame as shown in FIG. 2B.

Next, the base station permits the sleep mode entry of the terminal in the closest start frame of the start frames calculated based on the criterion frames in step 519. In more detail, the base station classifies the terminal into the sleep mode group allowing the entry after the shortest standby and permits the sleep mode entry in accordance with the listening interval synchronization of the corresponding group. In short, the base station transmits a sleep mode response message to the second terminal.

As set forth above, since the listening intervals of every sleeping terminal are synchronized in the broadband wireless communication system, the scheduling complexity of the base station for the sleeping terminals can be reduced.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A base station in a wireless communication system, the base station comprising:
an adjuster configured to, when a first terminal requests a sleep mode entry including lengths of requested sleep intervals and listening intervals that do not meet a certain condition, adjust the lengths of the sleep intervals and the listening intervals; and
a determiner configured to:
set a distribution of the sleep intervals and the listening intervals according to the adjusted lengths of the sleep intervals and the listening intervals; and
when a second terminal requests the sleep mode entry after the distribution of the sleep intervals and the listening intervals of the first terminal are set, determine a sleep interval among preset sleep intervals having the same length as an initial sleep interval length requested by the second terminal, and determine a sleep mode entry time of the second terminal in a start frame of the determined preset sleep interval, wherein the certain condition is defined according to a length of a sum of a maximum sleep interval and a maximum listening interval is greater than or equal to a length of the sum of remaining sleep intervals and listening interval frames.

2. The base station of claim 1, wherein the adjuster is further configured to adjust the lengths of the sleep intervals and the listening intervals to meet a condition expressed according to the following equation:

$$S \geq L \times (N-1)$$

where S denotes a number of initial sleep interval frames, N denotes an exponential component of a maximum sleep interval frame number, and L denotes a number of listening interval frames.

3. The base station of claim 1, wherein the adjuster is further configured to set the sleep interval length of the second terminal as an integral square multiple of two with respect to a preset minimum sleep interval length.

4. The base station of claim 1, wherein the preset sleep interval comprises sleep intervals for the first terminal.

5. The base station of claim 4, wherein the preset sleep interval further comprises sleep intervals set based on a plurality of criterion frames.

6. The base station of claim 5, wherein the determiner is configured to distribute the plurality of the criterion frames at regular frame intervals.

7. A method for controlling a sleep mode entry of a terminal at a base station in a wireless communication system, the method comprising:
determining whether lengths of requested sleep intervals and listening intervals meet a condition when a first terminal requests the sleep mode entry;
adjusting the lengths of the sleep intervals and the listening intervals when the condition is not satisfied;
setting a distribution of the sleep intervals and the listening intervals according to the adjusted lengths of the sleep intervals and the listening intervals; and
when a second terminal requests the sleep mode entry after the distribution of the sleep intervals and the listening intervals of the first terminal are set, determining a sleep interval among preset sleep intervals having the same length as an initial sleep interval length requested by the second terminal, and determining a sleep mode entry time of the second terminal in a start frame of one of the determined sleep interval, wherein the certain condition is defined according to a length of a sum of a maximum sleep interval and a maximum listening interval is greater than or equal to a length of the sum of remaining sleep intervals and listening interval frames.

8. The method of claim 7, wherein the condition is expressed according to the following equation:

$$S \geq L \times (N-1)$$

where S denotes a number of initial sleep interval frames, N denotes an exponential component of a maximum sleep interval frame number, and L denotes a number of listening interval frames.

9. The method of claim 7, further comprising:
setting the sleep interval length of the second terminal as an integral square multiple of two with respect to a preset minimum sleep interval length.

10. The method of claim 7, wherein the preset sleep interval comprises sleep intervals for the first terminal.

11. The method of claim 10, wherein the preset sleep interval further comprises sleep intervals set based on a plurality of criterion frames.

12. The method of claim 11, wherein the plurality of the criterion frames are distributed at regular frame intervals.

13. The method of claim 7, further comprising determining whether a maximum allocatable quantity of sleeping terminals are full, wherein the sleep mode entry time of the second terminal is determined when the maximum allocatable quantity of sleeping terminals are not full.

14. An apparatus of a base station for controlling a sleep mode entry of a terminal in a wireless communication system, the apparatus comprising:
an adjuster configured to, when a first terminal requests a sleep mode entry including lengths of requested sleep intervals and listening intervals that do not meet a certain condition, adjust the lengths of the sleep intervals and the listening intervals; and
a determiner configured to:
set a distribution of the sleep intervals and the listening intervals according to the adjusted lengths of the sleep intervals and the listening intervals; and
when a second terminal requests the sleep mode entry after the distribution of the sleep interval and the listening interval of the first terminal are set, determine a sleep interval among preset sleep intervals, having the same length as an initial sleep interval length requested by the second terminal, and determine a sleep mode entry time of the second terminal in a start frame of the determined preset sleep interval, wherein the certain condition is defined according to a length of sum of a maximum sleep interval and a maximum listening interval is greater than or equal to a length of the sum of remaining sleep intervals and listening interval frames.

15. The apparatus of claim 14, wherein the adjuster is further configured to adjust the lengths of the sleep intervals and the listening intervals to meet a condition expressed according to the following equation:

$$S \geq L \times (N-1)$$

where S denotes a number of initial sleep interval frames, N denotes an exponential component of a maximum sleep interval frame number, and L denotes a number of listening interval frames.

16. The apparatus of claim 14, wherein the adjuster is further configured to set the sleep interval length of the second terminal as an integral square multiple of two with respect to a preset minimum sleep interval length.

17. The apparatus of claim 14, wherein the preset sleep interval comprises sleep intervals for the first terminal.

18. The apparatus of claim 16, wherein the preset sleep interval further comprises sleep intervals set based on a plurality of criterion frames.

19. The apparatus of claim 18, wherein the plurality of the criterion frames are distributed at regular frame intervals.

20. The apparatus of claim 14, wherein the determiner is further configured to determine whether a maximum allocatable quantity of sleeping terminals are full, and determine the sleep mode entry time of the second terminal in response to determining that the maximum allocatable quantity of the sleeping terminals are not full.

* * * * *